Aug. 7, 1956 S. MOLNAR 2,757,570
AUTOMATIC KALEIDOSCOPE AND ENLARGING PROJECTION DEVICE
Filed Nov. 18, 1954 2 Sheets-Sheet 2
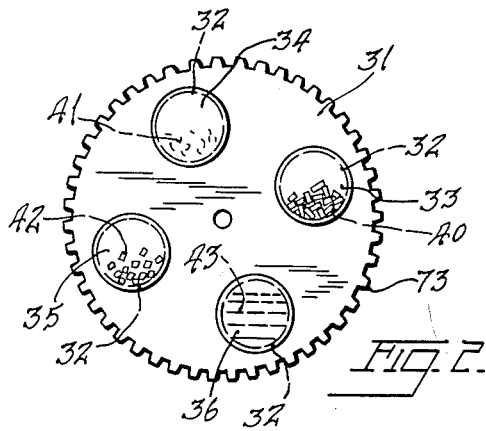
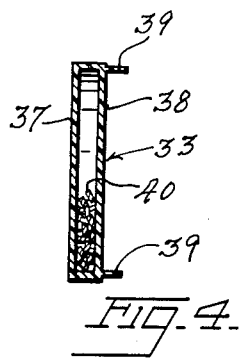
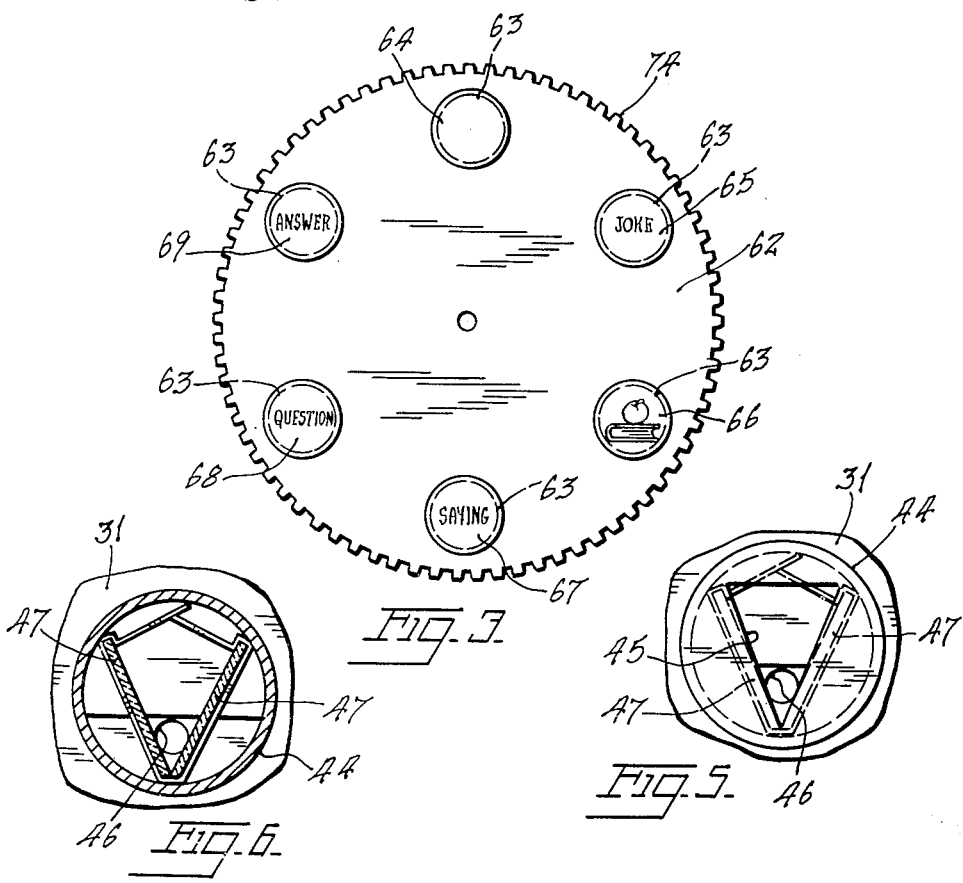
INVENTOR
STEVEN MOLNAR
BY
ATTORNEY

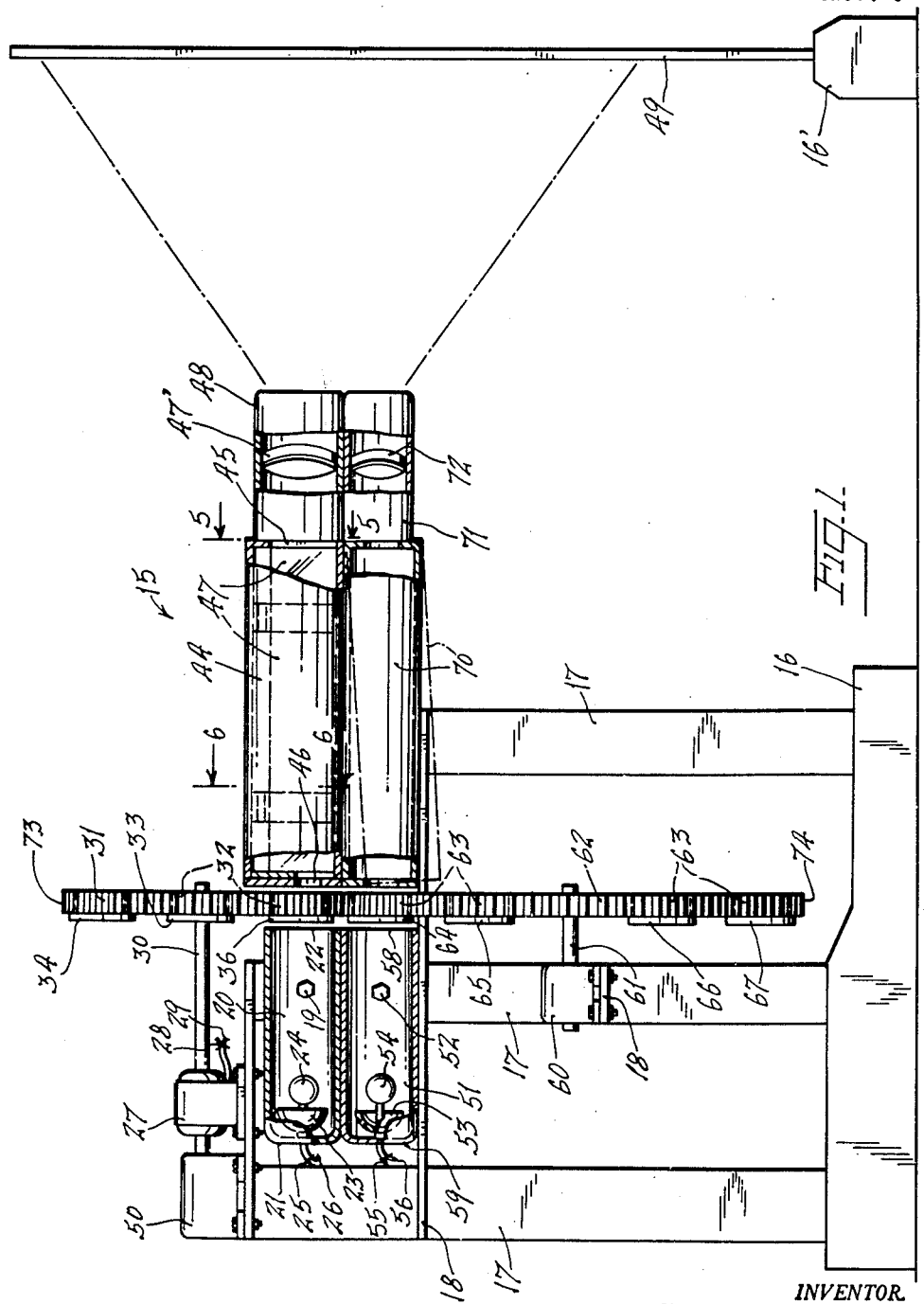

United States Patent Office 2,757,570
Patented Aug. 7, 1956

2,757,570

AUTOMATIC KALEIDOSCOPE AND ENLARGING PROJECTION DEVICE

Steven Molnar, New York, N. Y.

Application November 18, 1954, Serial No. 469,630

7 Claims. (Cl. 88—24)

This invention relates to new and useful improvements in optical instruments combining or incorporating a kaleidoscope and an enlarging projection tube.

More particularly, the present invention proposes the construction of an optical instrument automatically to change kaleidoscope and other transparency slides and to enlarge the visual appearance of them in a novel and convenient manner.

As a further object, the present invention proposes forming the instrument with two light sources and a pair of rotatable discs having a plurality of slide openings automatically and synchronically to be disposed seriatim in front of one of the light sources and providing a plurality of slides and a kaleidoscope for one disc for projection of kaleidoscopic material and another plurality of slides and a projection tube for the other disc for projection of other visual matter.

Another object of the present invention proposes constructing the instrument with a projector and a kaleidoscope each having a projection and an enlarging lens system so that photograph transparency or any other visual matter slides arranged in a predetermined sequence may be projected simultaneously or alternately on the same screen or surface as the kaleidoscope material.

For further comprehension of the invention, and of the objects and advantages thereof, reference is made to the following description and accompanying drawings, and to the appended claims in which the various novel features of the invention are more particularly set forth.

In the accompanying drawings forming a material part of this disclosure:

Fig. 1 is a side elevational view, partly diagrammatic, with parts broken away and shown in section, of an optical instrument constructed and arranged in accordance with the present invention.

Fig. 2 is a plan view of one of the discs with slides shown in Fig. 1.

Fig. 3 is a view similar to Fig. 2 but showing the other disc with slides thereon.

Fig. 4 is a cross-sectional view of one of the slides shown in Fig. 2.

Fig. 5 is an end view taken on the line 5—5 of Fig. 1.

Fig. 6 is a sectional view taken on the line 6—6 of Fig. 1.

Referring more particularly to the drawings, the apparatus or optical instrument is designated generally by the reference numeral 15.

Instrument 15 has a base 16 with uprights 17 and a number of cross shelves 18. In addition, a screen holding base portion 16' may be provided separate from the base 16, as shown in Fig. 1 or movably connected with it.

Mounted on one of the base uprights 17, as by a bolt 19, is a hollow sleeve 20 having a rear end 21 and an open front end 22. Mounted in the sleeve 20 adjacent the rear end 21 is a parabolic reflector 23 and mounted in front of the reflector 23 in the sleeve 20 is an electric light bulb 24 suitably connected with a power source (not shown) by wires 25 and 26 to provide a light source.

An electric motor 27 is mounted on the top shelf 18 of the base 16 and suitably connected with a power source by wires 28 and 29. Motor 27 has a motor shaft 30 on the front end of which is mounted a disc 31 having a plurality of radially disposed slide openings 32. The disc is vertically disposed with relation to the horizontally disposed sleeve 20 and the peripheral marginal portion of the disc is aligned with and covers the sleeve front open end 22. The slide openings 32 in disc 31 are alignable seriatim with the open front end of the sleeve and hence with light from the light source 24 as the disc is rotated.

A plurality of kaleidoscope slides 33, 34, 35 and 36 are provided for the disc and adapted removably to fit in the slide openings 32. While only four slides and slide openings are shown, it is apparent that more can be provided. Each kaleidoscope slide is provided with spaced transparent walls 37 and 38 and spring slide opening engaging members 39 and contains different kaleidoscope viewing material. For example, slide 33 may contain sparkling matter 40; slide 34, crystals or finely divided pieces of plastic 41; slide 35, rhinestones 42; and slide 36, oil and water 43. Various substances may be used and the slides may be arranged on the disc in any desired predetermined sequence. All kaleidoscope viewing material is loosely or movably mounted in the slides.

A kaleidoscope tube 44 having a front opening 45 and a rear opening 46 and the usual mirrors 47 is mounted on one of the shelves 18 with the rear opening 46 disposed in front of the disc 31 and aligned with the slide openings 32 as the disc is rotated and the slide openings come into alignment with the front open end 22 of the sleeve 20. In this manner, the kaleidoscope 44 is aligned with light from the light source through the slides.

An enlarging and projecting lens system 47' movably and adjustably mounted in a tube 48 is disposed at the front opening 45 of the kaleidoscope 44 and a screen 49 is provided on base portion 16' spaced from the lens system 47' for projecting kaleidoscopic images thereon. A stopping device 50 of any conventional type may be provided to stop the motor and the disc and hold the slides periodically between the light source and the kaleidoscope tube.

A second sleeve 51 is mounted beneath the sleeve 20 on a lower shelf 18 and bolted to one of the base uprights by bolt 52. The second sleeve 51 contains a reflector 53 and a light bulb 54 connected by wires 55 and 56 with a power source. The front end 58 of sleeve 51 is open and the rear end 59 may be closed except for the necessary opening for wires 55 and 56.

Mounted below the sleeve 51 on one of the shelves 18 is a bearing or pillow block 60 rotatably holding a shaft 61 to which is fixed a second disc 62 similar to disc 31 but of large diameter. Disc 62 contains a plurality of radially disposed slide openings 63 which are alignable with the front open end 58 of sleeve 51, and hence with light from the light source 54 therein, as the disc is rotated.

A plurality of transparency slides 64, 65, 66, 67, 68 and 69 are removably mounted on the disc 62 over the slide openings 63. Again while only six slides and slide openings are shown, more may be provided. The slides 64—69 may contain any visual matter, educational or advertisement, arranged in a predetermined sequence. For example, one transparency slide may contain a question and the next the answer to that question with advertisement matter wisely spaced and interspersed among the picture or other slides.

An enlarging and projection tube 70 is mounted in front of the disc 62 and aligned with the open end 58 of sleeve 51 and with light from the light source 54 when one of the transparency slides are disposed in front of the open end 58 of sleeve 51. Connected with tube 70 is a lens holding tube 71 in which adjustably and movably mounted is a lens system 72. The lens systems 72 and 47' and the tubes 70 and 44 are adapted to focus on and project images on the same screen 49.

Discs 31 and 62 are provided with peripheral meshing teeth 73 and 74, respectively, arranged so that the discs are driven together simultaneously and synchronically. Other well-known means, such as belts and pulleys or the like (not shown) may be used instead of teeth, however, for such driving. The discs can also be connected directly to separate motors in order to get the desired sequence of the different pictures.

The two tubes 44 and 70 can also be arranged to be inclined at various angles so that the device thus may be used outdoors and for various size displays, for toys and for all suitable purposes.

It is to be understood that any conventional kaleidoscope tube and enlarging projection tube may be used.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. An optical instrument automatically to change kaleidoscope slides and enlarge the visual appearance of the same comprising a base, a light source and a reflector mounted on the base, a disc having a plurality of radially disposed slide openings, said disc being rotatably mounted on the base with said openings alignable seriatim with light from the light source, a plurality of kaleidoscope slides removably mounted on the disc over said openings, kaleidoscope viewing material movably mounted in the kaleidoscope slides, a kaleidoscope tube having a front opening and a rear opening movably and adjustably mounted in front of said disc aligned with light from said light source, and an enlarging and projecting lens system movably and adjustably mounted at the front opening of the kaleidoscope tube, a second light source and reflector and a second disc rotatably mounted on the base with a plurality of radially disposed slide openings alignable seriatim with light from said second light source, a plurality of transparency slides removably mounted on said second disc over said slide openings therein, an enlarging projection tube and lens system movably and adjustably mounted in front of said second disc and aligned with light from said second light source, said two lens systems being adapted and disposed to focus on a single screen.

2. An optical instrument automatically to change kaleidoscope slides and enlarge the visual appearance of the same comprising a base, a light source and a reflector mounted on the base, a disc having a plurality of radially disposed slide openings, said disc being rotatably mounted on the base with said openings alignable seriatim with light from the light source, a plurality of kaleidoscope slides removably mounted on the disc over said openings, kaleidoscope viewing material movably mounted in the kaleidoscope slides, a kaleidoscope tube having a front opening and a rear opening movably and adjustably mounted in front of said disc alinged with light from said light source, an enlarging and projecting lens system movably and adjustably mounted at the front opening of the kaleidoscope tube, a second light source and reflector and a second disc rotatably mounted on the base with a plurality of radially disposed slide openings alignable seriatim with light from said second light source, a plurality of transparency slides removably mounted on said second disc over said slide openings therein, an enlarging projection tube and lens system movably and adjustably mounted in front of said second disc and aligned with light from said second light source, said two lens systems being adapted and disposed to focus on a single screen, and means simultaneously and synchronically to drive the two discs.

3. An optical instrument automatically to change kaleidoscope slides and enlarge the visual appearance of the same comprising a base, a light source and a reflector mounted on the base, a disc having a plurality of radially disposed slide openings, said disc being rotatably mounted on the base with said openings alignable seriatim with light from the light source, a plurality of kaleidoscope slides removably mounted on the disc over said openings, kaleidoscope viewing material movably mounted in the kaleidoscope slides, a kaleidoscope tube having a front opening and a rear opening movably and adjustably mounted in front of said disc aligned with light from said light source, an enlarging and projecting tube and lens system movably and adjustably mounted at the front opening of the kaleidoscope tube, a second light source and reflector and a second disc rotatably mounted on the base with a plurality of radially disposed slide openings alignable seriatim with light from said second light source, a plurality of transparency slides removably mounted on said second disc over said slide openings therein, an enlarging projection tube and lens system movably and adjustably mounted in front of said second disc and aligned with light from said second light source, said two lens systems being adapted and disposed to focus on a single screen, and means simultaneously and synchronically to drive the two discs, said means being a plurality of meshing teeth on the peripheries of the two discs.

4. An optical instrument automatically to change kaleidoscope slides and enlarge the visual appearance of the same comprising a base, a light source and a reflector mounted on the base, a disc having a plurality of radially disposed slide openings, said disc being rotatably mounted on the base with said openings alignable seriatim with light from the light source, a plurality of kaleidoscope slides removably mounted on the disc over said openings, kaleidoscope viewing material movably mounted in the kaleidoscope slides, a kaleidoscope tube having a front opening and a rear opening movably and adjustably mounted in front of said disc aligned with light from said light source, and an enlarging and projecting lens system movably and adjustably mounted at the front opening of the kaleidoscope tube, a second light source and reflector and a second disc rotatably mounted on the base with a plurality of radially disposed slide openings alignable seriatim with light from said second light source, a plurality of transparency slides removably mounted on said second disc over said slide openings therein, an enlarging projection tube and lens system movably and adjustably in front of said second disc and aligned with light from said second light source, said tubes and lens systems being adapted and disposed to focus on a single screen, said transparency slides containing a variety of advertising and educational subject matter and being disposed and arranged on said second disc in a prearranged sequence.

5. An optical instrument automatically to change kaleidoscope slides and enlarge the visual appearance of the same comprising a base, a light source and a reflector mounted on the base, a disc having a plurality of radially disposed slide openings, said disc being rotatably mounted on the base with said openings alignable seriatim with light from the light source, a plurality of kaleidoscope slides removably mounted on the disc over said openings, kaleidoscope viewing material movably mounted in the kaleidoscope slides, a kaleidoscope tube having a front opening and a rear opening movably and adjustably mounted in front of said disc aligned with light from said light source, enlarging and projecting tubes and lens systems movably and adjustably mounted at the front opening of the kaleidoscope tube, a second light source and reflector and a second disc rotatably mounted on the base with a plurality of radially disposed slide openings alignable seriatim with light from said second light source, a plurality of transparency slides removably mounted on said second disc over said slide openings therein, an enlarging projection tube and lens movably and adjustably mounted in front of said second disc and aligned with light from said second light source, said tubes and lens systems being adapted and disposed to focus on a single screen, said transparency slides containing a variety of advertising and educational subject matter and being disposed and arranged on said second disc in a prearranged sequence, and drive means automatically to rotate the discs and align the openings therein seriatim with light from the light source.

6. An optical instrument automatically to change kaleidoscope slides and enlarge the visual appearance of the same comprising a base, a light source and a reflector mounted on the base, a disc having a plurality of radially disposed slide openings, said disc being rotatably mounted on the base with said openings alignable seriatim with light from the light source, a plurality of kaleidoscope slides removably mounted on the disc over said openings, kaleidoscope viewing material movably mounted in the kaleidoscope slides, a kaleidoscope tube having a front opening and a rear opening movably and adjustably mounted in front of said disc aligned with light from said light source, enlarging and projecting lenses movably and adjustably mounted at the front opening of the kaleidoscope tube, a second light source and reflector and a second disc rotatably mounted on the base with a plurality of radially disposed slide openings alignable seriatim with light from said second light source, a plurality of transparency slides removably mounted on said second disc over said slide openings therein, an enlarging projection tube and lens system movably and adjustably mounted in front of said second disc and aligned with light from said second light source, said tubes and lens systems being adapted and disposed to focus on a single screen, said transparency slides containing a variety of advertising and educational subject matter and being disposed and arranged on said second disc in a prearranged sequence, drive means automatically to rotate the disc and align the openings therein seriatim with light from the light source, and means intermittently to start and stop the drive means to dispose and hold said slides periodically between the light source and the enlarging tube.

7. An optical instrument automatically to change kaleidoscope slides and enlarge the visual appearance of the same comprising a pair of superposed tubular projectors having projecting and enlarging lenses, each having a light source and reflector therefor, a pair of aligned discs rotatably mounted on the projectors behind said lenses and between the lenses and the light source and disposed perpendicularly to the axes of the projectors, means simultaneously and synchronically to rotate the discs, said discs each having a plurality of slide openings radially disposed and adapted seriatim to be positioned by the rotation of the disc in alignment with one of the lenses and with light from the light source for said lens, a plurality of slides removably mounted in the slide openings, said slides for one disc having kaleidoscopic viewing material loosely mounted therein, and a kaleidoscope mounted between the lens and disc of the projector having the disc with kaleidoscopic viewing material slides.

References Cited in the file of this patent

UNITED STATES PATENTS

| | | |
|---|---|---|
| 1,914,562 | Freeland | June 20, 1933 |
| 2,038,909 | Smith et al. | Apr. 28, 1936 |
| 2,099,904 | Pennington et al. | Nov. 23, 1937 |
| 2,297,767 | Hunt | Oct. 6, 1942 |
| 2,307,202 | Eddy | Jan. 5, 1943 |
| 2,553,005 | Regan | May 15, 1951 |

FOREIGN PATENTS

| | | |
|---|---|---|
| 235,994 | Great Britain | July 2, 1925 |
| 434,763 | Germany | Sept. 29, 1926 |
| 533,765 | Germany | Sept. 18, 1931 |